Nov. 8, 1938.   R. J. REICHERT   2,135,531
OPTICAL INSTRUMENT
Filed Jan. 12, 1935   4 Sheets-Sheet 1
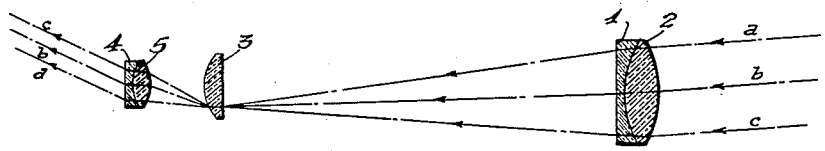
Fig. 1
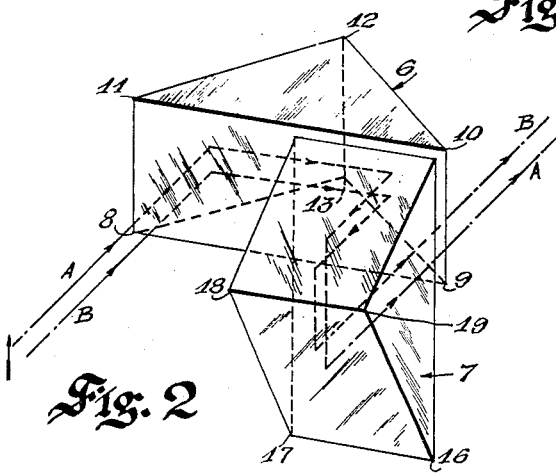
Fig. 2
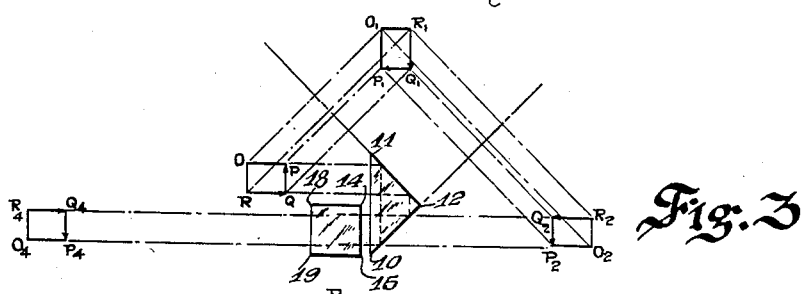
Fig. 3
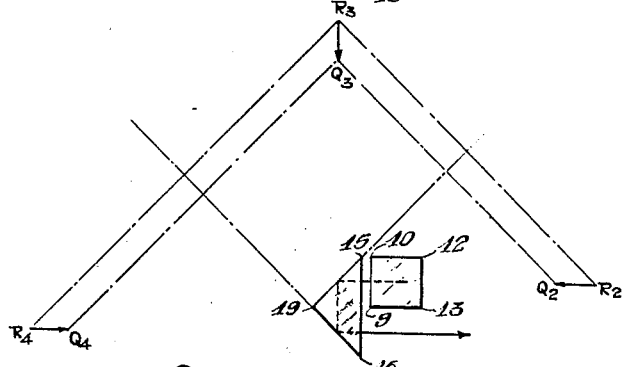
Fig. 3-a
INVENTOR.
Robert J. Reichert
BY
ATTORNEY.

Nov. 8, 1938.   R. J. REICHERT   2,135,531
OPTICAL INSTRUMENT
Filed Jan. 12, 1935   4 Sheets-Sheet 2

INVENTOR.
Robert J. Reichert
BY
ATTORNEY.

Nov. 8, 1938.　　　R. J. REICHERT　　　2,135,531
OPTICAL INSTRUMENT
Filed Jan. 12, 1935　　　4 Sheets-Sheet 3

INVENTOR.
Robert J. Reichert
BY
ATTORNEY.

Nov. 8, 1938. R. J. REICHERT 2,135,531
OPTICAL INSTRUMENT
Filed Jan. 12, 1935 4 Sheets-Sheet 4

INVENTOR.
Robert J. Reichert
BY
ATTORNEY.

Patented Nov. 8, 1938

2,135,531

UNITED STATES PATENT OFFICE 2,135,531

OPTICAL INSTRUMENT

Robert J. Reichert, Mount Vernon, N. Y.

Application January 12, 1935, Serial No. 1,463

2 Claims. (Cl. 88—34)

My invention relates to optical instruments and more particularly to the type which employs a system of lenses which invert the image, and in which it is therefore necessary to employ an inverting system to erect the image, and more particularly to an inverting system which employs reflecting surfaces.

Instruments for magnifying objects at a distance can be divided into two main groups, viz:— those using a positive lens system together with a negative lens system (producing a virtual image) known as the Galilean system and those using two positive systems of lenses producing a real inverted image. With the latter system it is necessary to use some optical method of inverting this image so that it may be viewed in erect position. It is with this latter type of instrument that this invention is concerned.

There are two systems of inverting this image that have heretofore been employed; one by a system of two positive lenses placed in the optical axis. This, of course, elongates the instrument and is, therefore, only used in such instruments as terrestrial telescopes, etc., where length is not objectionable.

The other system is to use a prism system or prism placed so as to invert the image. Various systems have been used, of which the most common is the Porro system. This consists of two right angle equilateral prisms having their hypotenuse faces parallel and their apices on opposite sides of the common hypotenuse plane. The apex lines of the prisms are at right angles to each other. In this system the light travels as shown in Figure 2 (to be described in detail hereafter) from which it will be seen that the axial beam passes through the hypotenuse faces at right angles and is almost totally reflected by the sides of the prisms.

In a binocular instrument it is vitally important that light originating from a single point source emerge from both sides of the binocular instrument as beams parallel to each other, so that when viewed by the two eyes they will give the impression of a single point, i. e. that they will strike the retinae of the respective eyes in conjugate points.

It has been impossible to design and build an instrument accurately enough to produce this parallelism, or rather to keep the divergence less than three minutes of arc which is the limit of the accommodation possible for the average eye. Greater divergence will cause a double image. Therefore, some means must be provided to adjust the instrument during or after assembly.

If the two halves of the binocular are attached to each other by a hinge to allow adjustment of the distance between the eye-pieces, it is necessary, in order to have the parallelism for all interpupillary adjustments, to have the optical axes on each side not only parallel to each other but also to the mechanical axis of the hinge.

Heretofore such adjustments have been achieved by moving the prisms individually in a direction perpendicular to the axis of the optical path and parallel to the hypotenuse; by rotating the objective lenses which are mounted eccentrically or by moving one side of the binocular instrument as a whole relative to the mechanical axis of the binocular.

These methods, however, are unsatisfactory owing to the small space available for such adjusting mechanisms, especially when such mechanisms are extended through the wall of the instrument in order to allow such adjustments to be made after the instrument has been assembled.

Moreover those systems in which the prisms are moved individually are unsatisfactory in that the prisms are not rigidly enough held in position to withstand the rough usage to which most optical instruments of this type are subjected.

I have discovered that I can obtain the desired rigidity of the prisms or other reflecting surfaces while obtaining adjustments thereof by rigidly mounting the reflecting members in a central housing and performing the necessary adjustments on the central housing.

Accordingly, objects of my invention are: to provide a novel adjustment means for displacing the outgoing beam of the erecting system with respect to the incoming beam; to provide a novel supporting means and adjusting means for said support of the reflecting surfaces; to provide a novel support for said reflecting surfaces (to be known hereafter as the central housing); to provide a novel adjustment of said central housing in a housing (to be known hereafter as the main housing) of the instrument, to provide a novel means of mounting the reflecting surfaces in a central housing so that all these reflecting surfaces retain a fixed relative position to each other and to the central housing, to provide novel means for adjustment by one of the following or combination of any or all:

1. A lateral adjustment in the hypotenuse plane, the reflecting surfaces remaining parallel to their original position.

2. Rotation about an axis or axes perpendicular to the hypotenuse plane.

3. Rotation about an axis or axes lying in the hypotenuse plane.

Further objects of my invention are: to provide means for adjusting the reflecting surfaces by a rotation of the central housing about two axes not parallel to each other; to provide means whereby after the adjustment has been made the central housing is held rigid by being attached at one point to the main housing by means of a semi-rigid screw and also by means of two screws rigidly attached to the central housing and said screws held under tension by screw heads held in place in the main housing.

Heretofore, prisms have been used in practice for providing the necessary reflecting surfaces to the practical exclusion of mirrors due to the fact that rear surface reflecting mirrors produce a double image owing to partial reflection on the front surface. Attempts to use front surface metal reflecting mirrors such as stainless steel have been optically unsatisfactory. It has also been proposed to use plating on metal but this is unsatisfactory owing to the impossibility of obtaining an optically plane surface on the metal base.

I have discovered that I can materially increase the percentage of light transmitted by the inverting system by replacing prisms by a glass surface covered with a suitable metal or metallic substance which produces a good optical reflecting surface when made in a special manner.

Accordingly, objects of my invention are: to provide, in an inverting system as defined in paragraph one of this application, means for increasing the percentage of light transmitted by the inverting system, to provide a novel reflecting medium; to provide a novel reflecting surface; to provide a novel reflecting surface on the outer face of glass; to provide a novel reflecting surface produced by the cathode sputtering process of aluminum or other metallic substance.

There are other objects of my invention which together with the above will appear in the detailed descriptions which follow in connection with the drawings in which Figure 1 is a standard diagram of the light rays of an optical system using two positive lens systems and producing an inverted image.

Figure 2 is a perspective of a prism system known as the Porro system.

Figure 3 is a light diagram illustrating the partial erection of an image by the first prism of Porro erecting system.

Figure 3A is a light diagram illustrating the completion of the erection by the second prism of a Porro erecting system.

Figure 4:
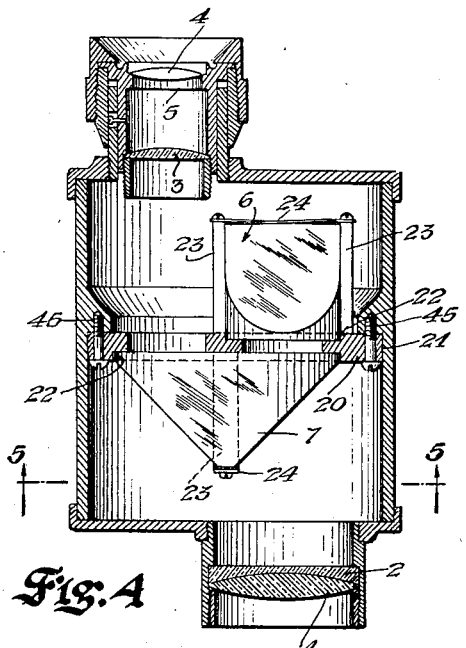
Figure 4 is a cross-section of a monocular of one form of my invention.

Referring to Figure 1, a cemented doublet 1 and 2 forms one of the positive systems. A cemented doublet 4 and 5 and a planoconvex lens 3 form the other positive system. As shown by the rays $a$, $b$ and $c$ coming from a point at infinity and going thru this complete system, the image is inverted.

These lenses are mounted in a suitable main housing so that the rays of light which pass thru the system are reflected at plane surfaces, in such a manner as to erect the image. Such a system consisting of two rectangular right angle equilateral prisms 6 and 7 is shown in Figure 2.

Prism 6 comprises a hypotenuse face 8—9—10—11; two reflecting faces 8—11—12—13 and 9—10—12—13 and line 12—13 is the apex. Prism 7 comprises a hypotenuse face 14—15—16—17 and two reflecting faces 14—15—18—19 and 16—17—18—19 and line 18—19 is the apex. These two prisms are placed so that the two hypotenuse faces 8—9—10—11 and 14—15—16—17 are parallel; the apices 12—13 and 18—19 are on opposite sides of the hypotenuse faces and the lines of the apices 12—13 and 18—19 are at right angles to each other.

These prisms are so mounted in the central housing that incident light as illustrated by rays A and B enters the prism system thru half of the hypotenuse face 8—9—10—11 at approximately right angles thereto and strikes the surface 8—11—12—13 where most of it is reflected to surface 9—10—12—13 where most of it is again reflected and leaves prism 6 thru the other half of the hypotenuse surface, 8—9—10—11. The light then enters prism 7 thru half of the hypotenuse face 14—15—16—17, and strikes the reflecting surface 14—15—18—19 where most of it is reflected on to the reflecting surface of 16—17—18—19 where most of the light is again reflected and leaves the erecting system thru the other half of the hypotenuse face 14—15—16—17.

In Figure 3, OPQR is an image formed by the objective 1 and 2 as shown in Figure 1. Figure 3 shows that after reflection in surface 8—11—12—13 OPQR takes the position $O_1P_1Q_1R_1$. After reflection in surface 9—10—12—13 the image takes the position $O_2P_2Q_2R_2$. Figure 3A shows a side view of the image $Q_2R_2$. $Q_3R_3$ is the side view after reflection in surface 14—15—18—19, and $Q_4R_4$ the side view of the image after reflection in surface 16—17—18—19. The final image $O_4P_4Q_4R_4$ is shown in Figure 3 from which it will be seen that the image OPQR has been totally inverted by the four reflections.

These prisms are rigidly mounted on a plate or housing to be hereafter called the central housing. They will then retain their relative position throughout any movement of the said central housing. Such a central housing is shown in Figure 4 and Figure 5.

Figure 5:
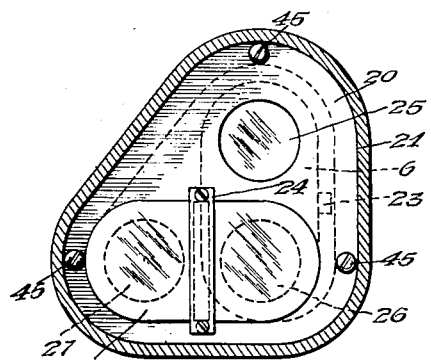
Figure 5 is an elevation cross-section thru 5—5 of Figure 4.

In Figures 4 and 5 the main plate or central housing has indentations 22 on both sides in which the respective hypotenuse faces of the prisms 6 and 7 rest; one prism being on one side of the plate and the other prism being on the other side of the plate.

Four pillars 23 are rigidly fastened to the plate at right angles forming an integral part of the central housing and extend on either side of the prisms 6 and 7. Across the top of each pair of pillars 23 are fastened springs 24 pressing on the apices of the prisms 6 and 7 and hold the prisms rigidly in the indentations 22 in the central housing. Suitable openings 25, 26 and 27 are made in the central housing to allow for the passage of the light rays.

Any other system of prisms which will invert the image can be used such as any of the systems described by specifications given in "Application of the Algebraic Equations to Optical Design" #550 vol. 22 of the Scientific Papers of the Bureau of Standards, pp. 176, 177, 178, 179, 180, 182 and 183 whether with the exact specifications mentioned or other suitable ones.

Figures 13, 14:
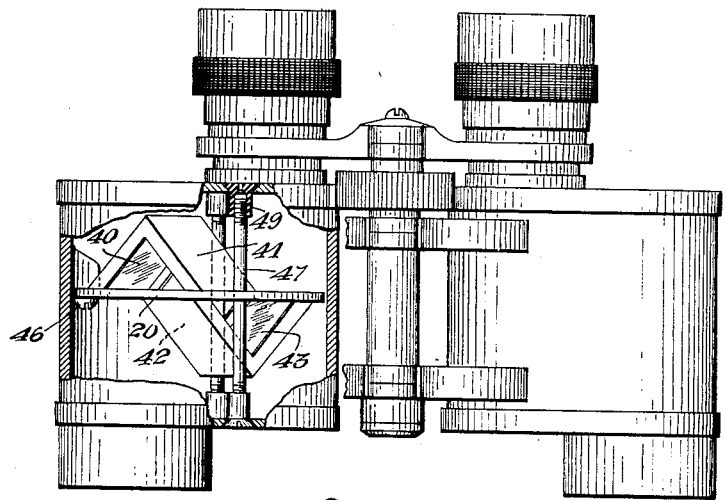
Figure 13 is a partial elevation and cross-section showing my novel reflecting system of mirrors and my novel adjustment for the central housing in which the mirrors are rigidly mounted.
Figure 14 is a perspective of my novel mirror system.

A novel system which I discovered is shown in Figure 14. Two mirrors 40 and 41 defined by points 28—29—30—31 and 30—31—32—33 are made from pieces of rectangularly shaped optically plane glass having one surface covered or plated with aluminum metal particles by the cathode sputtering process. One such process comprises placing the mirror to be coated under a bell jar of glass. Some inches beneath it, there is a coil of wire in which is placed a small scrap of aluminum. The bell jar is sealed and the air pumped out to a very low vacuum, then the coils are heated electrically which evaporates the metal and it recondenses on the glass.

Air is then admitted and converts the top layer of the aluminum into aluminum oxide known as alumina, which acts as a non-corrosive and non-oxidizable protection.

It is believed that the sputtering process consists of covering the surface with an atomic layer of metal.

In accordance with this process, a mirror surface is formed on the optically plane glass which will reflect light to the degree of perfection required and will not tarnish when exposed to the air. Such a reflecting surface is far superior to prisms in that the absorption of light by the four mirrors is approximately 5% as against 30% for the prisms. It will be obvious that other sputtering processes of applying aluminum or other metals to glass may be employed. In this sputtering process the metal coating is believed to be held in contact with the glass base by atomic cohesion and thus produces a reflecting surface as plane as that of the base.

These mirrors are mounted with their covered or mirrored surfaces towards each other, having a common side 30—31, and having their surfaces at right angles to each other.

Two similar mirrors 42 and 43 defined by points 34—35—36—37 and 36—37—38—39 are similarly mounted. The four mirrors are mounted in the central housing as shown in Figure 6 in such a manner that line 30—31 is a perpendicular to line 36—37 and the plane formed by points 28—29—32—33 is parallel to the plane formed by points 34—35—38—39.

Light entering this system represented by C and D in Figure 14 will first strike mirror 40 and be reflected on to mirror 41 where it will be again reflected to mirror 42 and again reflected on to mirror 43 after which it will emerge as rays parallel to the rays entering the system. Moreover the image after reflection in the four mirrors will have been completely inverted.

Figures 6, 7:
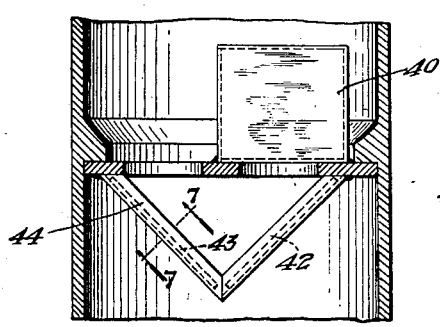
Figure 6 is a cross-section of my novel optical system employing mirrors as the reflecting medium.
Figure 7 is a cross-section thru 7—7 of Figure 6.

One method of mounting the mirrors rigidly in the central housing is shown in Figure 7. The mirror 43 is placed in an indentation 44 formed in central housing. Suitable openings are provided in the central housing to allow for the passage of the light rays. Cement or glue is used to hold the mirror rigidly in the indentation 44.

Any other system of mirrors or any combination of mirrors and prisms which will erect the image can be used.

Figure 8:
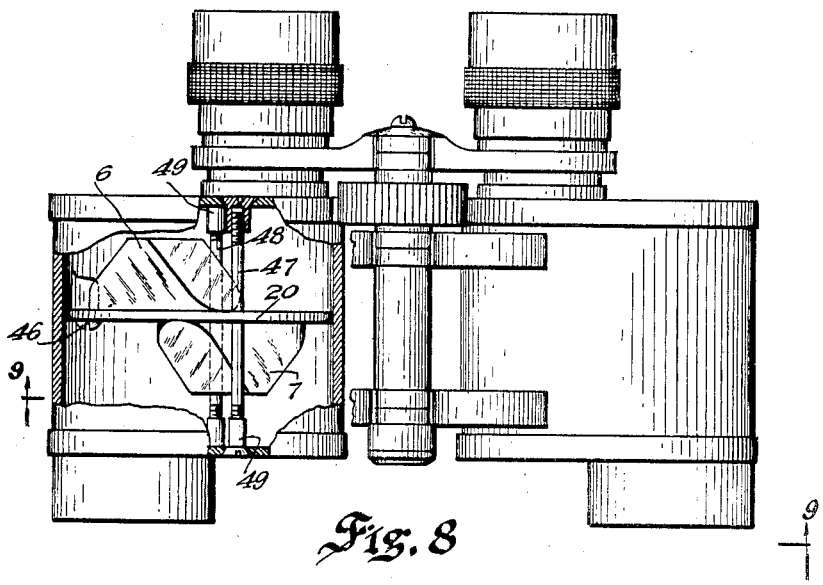
Figure 8 is a partial elevation and cross-section showing my optical system with my novel adjustment for the central housing.

The lenses 1, 2, 3, 4 and 5 together with the central housing are mounted in a suitable housing as shown in Figures 4, 8 and 13. Lenses 3, 4 and 5 are mounted in a standard eye-piece housing to which is attached a standard eye-cap. Lenses 1 and 2 are mounted in a standard objective housing.

In Figure 4 which shows a monocular, the central housing is held rigidly in the main housing by means of screws 45.

Figure 9:
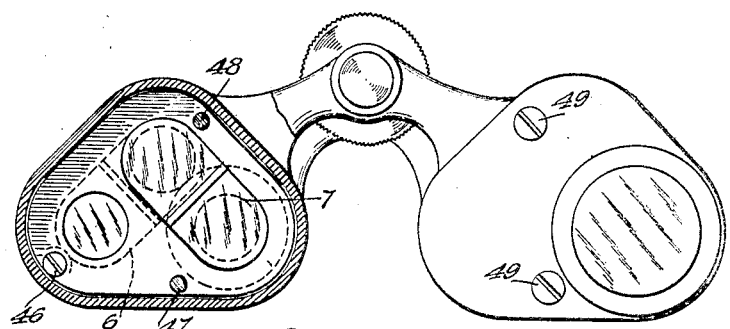
Figure 9 is a partial elevation and cross-section thru 9—9 of Figure 8.

Figures 8 and 9 and 13 show a binocular design embodying my novel method for adjusting the central housing and for holding the same rigid after adjustment has been made. A screw 46 holds the central housing 20 to the main housing of the binocular. It is of sufficient elasticity to allow for any slight rotation of the plate 20 acting as a universal joint. A 4—40 brass screw fulfills this condition.

Figure 10:
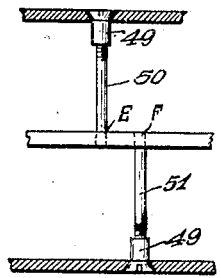
Figure 10 is a detail of an alternative adjusting means.

Long screws 47 and 48 as shown in Figures 8, 9 and 10 are made integral with or rigidly attached to the central housing 20. These screws extend to either side of the central housing, their ends being threaded. Opposite the ends of these screws are openings in the main housing in which screw-heads 49 are fitted. These screw-heads 49 are internally threaded to receive the threaded ends of screws of 47 and 48.

Thus by tightening the screw head at one end of screw 47 and loosening the screw head at the opposite end, the central housing will be rotated about an axis thru screw 46 and perpendicular to screw 48. Similarly by a tightening and loosening of the screw heads on screw 48, the central housing can be rotated around an axis thru screw 46 perpendicular to screw 47. After the adjustment has been made, the screw heads can be tightened and the central housing will then be held rigidly in place relative to the main housing, especially as the screws 47 and 48 will then be under tension. If owing to the construction of the instrument it is not feasible to extend either or both screws 47 and 48 in both directions to reach the screw heads extending thru the main housing, it is satisfactory to divide either or both screws into two parts, as shown in Figure 10 where the two screws 50 and 51 take the place of the single screw 47 or 48. However, if a plane perpendicular to screws 50 and 51 thru screw 46 meets screws 50 and 51 in E and F, the points 46, E and F should lie in an approximately straight line.

Figure 11:
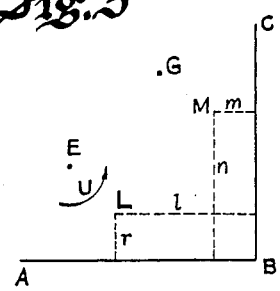
Figures 11 and 12 are diagrammatic sketches illustrative of movements of the central housing.
Figure 12:
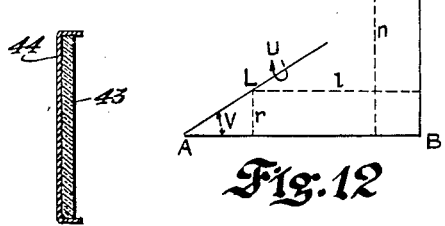

As explained previously, it is necessary in a binocular construction to provide an adjustment which will, by moving the optical axis of the light passing thru the erecting system, bring the images of both sides of the binocular into coincidence for all interpupillary distances. I have discovered that this can be done by a lateral movement of the central housing in a plane parallel to the two apices 12—13 and 18—19 of the prisms or parallel to the two common sides of the mirrors viz 30—31 and 36—37. Such a plane is shown in Figures 11 and 12. AB is the plane of the normals to the reflecting surface of the first prism or to the first two mirrors 40 and 41. BC is the similar plane of the normals to the reflecting surfaces of the second prism or to the normals to the second pair of mirrors 42 and 43. An entrant ray meets the plane of the paper in IL and emerges at M.

A properly chosen lateral movement of the central housing is therefore sufficient to bring the optical axis into parallelism with the mechanical axis.

I have also discovered that this alignment can be accomplished by my novel method of rotating the central housing about two axes perpendicular to the plane of the paper in Figure 11.

I have also discovered that this alignment can be accomplished by my novel method of rotating the central housing about any two axes not parallel to each other lying in the plane of the paper in Figure 11 or 12.

Properly chosen angles of rotation about two axes in the plane of the paper in Figure 12, said axes not to be parallel, will therefore be sufficient to bring the optical axis into parallelism with the mechanical axis.

It will now be clear from the above demonstrations that any movement of the central housing is either one or a combination of the above movements.

The method described in the description of Figures 8, 9 and 13 describes a novel method for causing the rotations of the last type. However, any suitable mechanism for causing one or more of the above motions may be employed. The central housing may be moved by a mechanism operated from within or from without the main housing. The former is preferable as the adjustment can be made without danger of getting dust in the binocular or of altering the adjustment while closing up the binocular after the adjustment.

I claim:

1. In an optical system, a main housing, a system of lenses mounted in said housing for producing an inverted image of a distant object, the rays from which are intercepted by said system and a system of a plurality of reflectors placed in the optical path for inverting the image, a central housing for rigidly supporting said reflectors, means for holding a fixed point of said central housing rigid relative to the main housing, means comprising a plurality of screws rigidly secured to said central housing for the purpose of adjusting said central housing together with the said reflectors rigidly attached thereto by rotating said central housing, about two axes thru said fixed point and lying in a plane perpendicular to the axis of the optical path, a plurality of screw heads fitting in openings in the main housing and screwing on to the ends of the aforementioned screws for the purpose of adjusting the said reflectors by moving the said screws in the direction of their length and means for maintaining said reflectors in positions fixed relative to each other and to the said central housing during said adjustment.

2. In an optical system, a main housing, a system of lenses mounted in said housing for producing an inverted image of a distant object, the rays from which are intercepted by said system and a system of a plurality of reflectors placed in the optical path for inverting the image, a central housing for rigidly supporting said reflectors, means for holding a fixed point of said central housing rigid relative to the main housing, means comprising a plurality of screws rigidly secured to said central housing for the purpose of adjusting said central housing together with the said reflectors rigidly attached thereto by rotating said reflectors, about two axes thru said fixed point and lying in a plane perpendicular to the axis of the optical path, a plurality of screw heads fitting in openings in the main housing and screwing on to the ends of the afore-mentioned screws for the purpose of adjusting the said reflectors by moving the said screws in the direction of their length, and for the purpose of maintaining the said reflectors in a fixed relative position to the main housing after adjustment is completed by tightening said screw heads and keeping the said screws held by the said screw heads under tension and means for maintaining said reflectors in positions fixed relative to each other and to the said central housing after said adjustment.

ROBERT J. REICHERT.